United States Patent
Nielsen et al.

(10) Patent No.: US 7,711,643 B2
(45) Date of Patent: May 4, 2010

(54) SELF-SERVICE TERMINAL

(75) Inventors: Paul Nielsen, St. Andrews (GB); Mel Walter, Wildwood, MO (US)

(73) Assignee: NCR Corporation, Dayton, OH (US)

( * ) Notice: Subject to any disclaimer, the term of this patent is extended or adjusted under 35 U.S.C. 154(b) by 2338 days.

(21) Appl. No.: 10/051,358

(22) Filed: Jan. 18, 2002

(65) Prior Publication Data
US 2002/0099658 A1      Jul. 25, 2002

(30) Foreign Application Priority Data
Jan. 24, 2001    (GB)    ................... 0101846.4

(51) Int. Cl.
*G06Q 40/00*    (2006.01)

(52) U.S. Cl. .......................... 705/43; 705/44

(58) Field of Classification Search .............. 705/10–44
See application file for complete search history.

(56) References Cited

U.S. PATENT DOCUMENTS

| | | | |
|---|---|---|---|
| 5,867,153 A | 2/1999 | Grandcolas et al. | |
| 6,065,120 A * | 5/2000 | Laursen et al. | 726/5 |
| 6,084,528 A | 7/2000 | Beach et al. | |
| 6,431,439 B1 * | 8/2002 | Suer et al. | 235/380 |

FOREIGN PATENT DOCUMENTS

| | | |
|---|---|---|
| DE | 20000498 | 5/2000 |
| EP | 0 537 756 | 4/1993 |
| EP | 0 903 903 | 3/1999 |
| EP | 0 964 374 | 12/1999 |
| EP | 1 069 500 | 1/2001 |
| EP | 1 136 961 | 9/2001 |
| GB | 2 351 594 | 1/2001 |
| JP | 315278 | 11/2000 |
| JP | 109620 | 4/2001 |
| WO | 98/36552 | 8/1998 |
| WO | WO 98/40826 | 9/1998 |
| WO | 00/49547 | 8/2000 |
| WO | 01/01300 | 1/2001 |
| WO | 01/03080 | 1/2001 |

OTHER PUBLICATIONS

"Dialog. Sun-Sentinel" Dialog. Sun-Sentinal, XP002932299.

* cited by examiner

*Primary Examiner*—Frantzy Poinvil
(74) *Attorney, Agent, or Firm*—Gregory A. Welte

(57) ABSTRACT

A self-service terminal, such as an automated teller machine (12), is described. The terminal (12) has a display (52), and includes means (44,84) for accessing a mobile portal (30), whereby the terminal (12) is operable to retrieve information adapted for viewing on a portable device, and to present at least some of the retrieved information to a user on the display (52). The terminal (12) may also include a printer (56) for providing a user with a printed version of some of the information presented on the display (52). A network of self-service terminals is also described.

22 Claims, 4 Drawing Sheets

SELF-SERVICE TERMINAL

BACKGROUND OF THE INVENTION

The present invention relates to a self-service terminal (SST) and to a network of SSTs. In particular, the invention relates to an automated teller machine (ATM).

SSTs are public access devices that are typically located in publicly accessible areas, and are operated by a large number of different users. One type of SST is an ATM. ATMs are installed in a large number of countries world-wide and provide users with a convenient source of cash.

A number of factors have contributed to mass-market adoption of ATMs. These include:
- an intuitive and simple ATM user-interface, typically comprising an encrypting keypad, a display, function display keys (FDKs) for selecting options presented on a screen on the display, and the application flow (that is, information displayed on a screen in response to user input);
- ubiquity of ATM networks (over 850,000 ATMs are deployed world-wide), which provides high availability of ATMs;
- development of a large and broadly-held card base (over a billion cards in circulation can be used to access ATMs); and
- a limited set of transactions, typically comprising cash dispensing, balance inquiry, deposits, and funds transfer.

These features have created what may be called "the 60-second experience" (that is, a user expects that no-one will spend more than one minute at an ATM). Thus, a user associates ATMs with a fast and convenient source of cash.

A disadvantage associated with ATMs, however, is that the technologies and features that provide these benefits have also made it difficult for ATM owners and network operators to introduce new functions and information.

Most ATMs use hierarchical communications protocols that dictate the exact communications path that any given transaction will take, which makes an ATM network and individual ATMs within that network vulnerable to any failure that occurs in that path. In particular, a failure in any "switch" in the network could stop the operation of all the ATMs in the ATM network. A "switch" is the hardware and software that route a transaction entered at an ATM to a host computer system holding account data relating to the person requesting the transaction.

To offset the vulnerability of the ATM network to a single point of failure, all the components in an ATM network are designed to be "fault-tolerant" and the switch software is extensively tested before any new functions are introduced. The costs of introducing any new service or function can be high, because of the extensive testing that has to be performed, and because many of the components used in an ATM network use proprietary technology that is not shared across the computer and communications industries more broadly.

The advent of the Internet is changing both the technical and consumer landscape for ATM owners and network operators. At a technical level, Internet technologies and features such as TCP/IP, the World Wide Web (hereinafter referred to as the 'Web'), and Web servers, give ATM owners and network operators a potential alternative to the conventional ATM hierarchical architecture.

An ATM network based on Internet technologies could be just as secure and reliable as a traditional ATM network, but have lower operating costs and be more amenable to the introduction of new functions. An Internet-based ATM network would also be reliable because it would have no single point of failure. The inherent "peer-to-peer" nature of the Internet means that any ATM or server that failed would not affect the service provided by the remaining servers and ATMs in the network.

Network operating costs would also be lower because the network would be based on standard technologies used throughout the computer and communications industry, rather than on proprietary technologies supported by a small number of controlling firms and sold in relatively small volumes.

An Internet-based ATM network would be amenable to rapid and inexpensive introduction of new functions, because doing so would not adversely affect the reliability of the network or require the use of proprietary technologies or the co-operation of any controlling firms.

At a user level, the advent of the Internet has changed user expectations about the availability of information. The large number of Web users has stimulated "content providers" (where a "content provider" is any person or firm with information that can be distributed over the Web). As a result, users now expect any information that can be rendered in digital format to be made available via the Web, for example, news, weather, maps, photos, email, tickets, money, and such like. When information is digitized and stored or sent via the Internet, it becomes "Internet content".

Increasingly, users also expect their Internet content to be personalized, to reflect their habits and preferences. Some Internet content is delivered to all users identically, subject only to variations imposed by differences in particular Web browsers (that is, two different types of Web browser may render the same information slightly differently on a display). Thus, a generic (un-personalized) Web page would present the same type and format of information to every person who visits that Web page, in a similar way to a billboard that presents the same information to every viewer.

Personalization, however, enables the selection and presentation of Internet content to be varied according to the user. At any given Web site where personalization is used, one user may receive different content, presented differently, than another user. In some cases personalization results from conscious choices made by the user, for content, layout, or both, as in MyYahoo! (trade mark). In other cases personalization results from the content owner's analysis of information collected about the user, so that the content owner (or Web site owner) tailors the user's Web site experience in a manner that the content owner believes most useful. This may be achieved, for example, using a customer relationship management software package.

There has also been an emergence of mobile wireless data services to cater for the needs of users having portable wireless devices, such as cellular telephones. Due to the screen size, keypad, and bandwidth limitations associated with conventional cellular telephones, PC Web content must be formatted specially for these devices. Protocols and technologies (such as wireless application protocol (WAP) and i-Mode) have been developed to enable portable devices to access the PC Web, and to ensure that Internet content is optimally rendered for delivery to handheld devices.

Internet content providers are developing "WAP sites", which are to WAP what PC Web sites are to the PC Web. These WAP sites (or similar sites using protocols other than WAP) have destinations marked with a unique address, so that users enter this address into their microbrowser (installed in the portable device) to connect to the WAP site using wireless transmission and obtain news, stock quotes, entertainment, and other information formatted for portable devices having small displays.

Operators, content providers, and others are developing "mobile portals" such as Yahoo Mobile (trade mark) and Vizzavi (trade mark), that are similar to the well-known portals on the PC Web—AOL (trade mark), Yahoo! (trade mark), Wanadoo (trade mark), and such like. Furthermore, these PC Web portals are positioning themselves to become mobile portals, so that people who use the PC version will be able to bring appropriate aspects of that experience to their wireless device.

ATM owners and network operators are therefore serving a mass market that, due to the PC Web and wireless technologies, is coming to expect convenient access to a large range and quantity of information. The ATM industry, however, has not been very successful in putting these technologies to work in a way that either reduces cost or delivers a new or better experience to users. Wireless technologies have been used in existing ATM networks, to enable ATM deployment on riverboats and other locations where a landline is unavailable or not cost effective to install. This approach gives ATM owners more flexibility in deployment and redeployment, but does not significantly reduce the total cost of operation (indeed, the cost in some cases may be higher) or deliver any new functions.

There are a number of different approaches to provide Web content on ATMs.

One approach is to add a PC Web browser to an ATM and connect the browser to new kinds of content. The conventional ATM network remains intact for delivering traditional content and functions (mainly cash-dispensing), but adds news, weather, stock quotes, and other content from the PC Web, all knit together seamlessly from the user's vantage. This approach provides some new functions (whichever PC Web content the ATM owner chooses to obtain), but is not personalized to the user, does not reduce operating cost for the ATM owner, is typically costly and time-consuming to implement because each network that requires Web-enablement is a custom development, and there is the risk that any changes to the source web sites will adversely affect the new functions on the ATM. For example, if an ATM owner connects to XYZ web site, and incorporates the XYZ content into an ATM screen as a new function, and later XYZ changes its Web site in some manner, the new function at the ATM might no longer work.

All PC Web sites assume the user has a large display, a full alpha-numeric keyboard, a mouse, more or less complete privacy, and as much time to spend browsing as is desired. ATMs, by contrast, present a generally smaller display, a nine-key keypad, typically eight function display keys, no mouse, a semi-public or public environment, and a user expectation for the 60-second experience.

A fundamental problem is that to regard an ATM as though it is a PC alienates users; yet to take content designed for the PC and repackage it for the ATM is time-consuming and expensive.

Yet another approach to provide Web content on an ATM tailors PC Web content to fit the ATM experience but does so as a dedicated proprietary ATM portal to configure ATM content for presentation and navigation on an ATM within an ATM network. A proprietary ATM portal company may make technical and business alliances with a content provider, such as an event ticketing company, and integrate that content provider's PC Web site with the ATM portal company's own proprietary software and server. The ATM portal company may then deliver that PC Web content via an existing ATM network to ATMs whose owners install the ATM portal company's client-level software. This approach ensures that the content will comply with the user-interface of the ATM and may be relatively inexpensive for the ATM owner to deploy, but is not personalized to the user, does not lower the ATM owner's total operating costs, and depends on the ATM portal company's ability to sign alliance agreements with content providers and ATM owners.

There is therefore a need:
- to deliver Web content to an ATM at low cost to the ATM owner while preserving the 60-second experience and other aspects of the user interface that ATM users expect;
- to provide an ATM with Web content that is personalized for a user so that the Web content emulates the Web content of the user's wireless device; and
- to reduce the total cost of operation of ATM networks.

SUMMARY OF THE INVENTION

It is an object of the present invention to obviate or mitigate these or other disadvantages associated with prior art self-service terminals.

According to a first aspect of the present invention there is provided a self-service terminal having a display, wherein the terminal includes means for accessing a mobile portal, whereby the terminal is operable to retrieve information adapted for viewing on a portable device, and to present at least some of the retrieved information to a user on the display.

The term "mobile portal" as used herein denotes a server that provides information (including data, resources, and services) intended to be viewed on devices having displays that are typically smaller than those used in conventional PCs. These portable devices are typically handheld, and include cellular radiotelephones, personal digital assistants, pocket PCs, and such like. A mobile portal may provide information using a standard protocol such as the wireless application protocol (WAP), i-Mode, or such like.

The means for accessing a mobile portal may include a wireless transceiver and a software component, whereby the software component interfaces with the wireless transceiver and a terminal application, so that the software component retrieves information from the mobile portal and configures the information to a format suitable for presentation on the terminal display by the terminal application.

By virtue of this aspect of the invention, an SST is provided that enables a user to obtain Web-based information in a format that can easily be viewed at an SST.

Preferably, the terminal includes a printer for providing a user with a hard copy of information retrieved from the mobile portal. The printer may be configurable to print only a selection of the information retrieved from the mobile portal.

Preferably, the terminal is operable to identify a user, to determine whether that user has provided the mobile portal with pre-entered selections, and to retrieve any pre-entered selections relating to the user from the mobile portal.

Where the SST is an ATM, the means for accessing a mobile portal is preferably separate from the means for accessing a transaction authorization system.

Where the SST is an ATM, this aspect of the invention has the advantage that a user is able to access personalized Web content specifically designed for a lower function user interface than is provided on a conventional PC. Where a printer is installed on the ATM, a user is able to print the retrieved information, thus enabling the ATM to be used as a fulfillment device for Web transactions.

According to a second aspect of the present invention there is provided a method of retrofitting an automated teller machine, the method comprising the steps of: installing a wireless transceiver into the ATM and upgrading a terminal application resident on the ATM to include a mobile portal software component, where the software component is able to access a mobile portal for retrieving information adapted for viewing on a portable device, and to configure the retrieved information for presenting to a user of the ATM.

By virtue of this aspect of the invention, an ATM may be retrofitted to enable the ATM to have Web access, without interfering with any conventional transaction authorization network to which the ATM is connected.

According to a third aspect of the present invention there is provided a self-service terminal having a display, wherein the terminal includes portable device emulation means, whereby the terminal is operable to retrieve and display information intended for a portable device.

According to a fourth aspect of the present invention there is provided a mobile portal software component for installing on an ATM, whereby, in use, the software component is able to access a mobile portal for retrieving information adapted for viewing on a portable device, and to configure the retrieved information for presenting to a user of the ATM.

According to a fifth aspect of the invention there is provided a network comprising a plurality of ATMs connected to a bank host via a switch, for the delivery of traditional content; and connected to one or more mobile portals, for the delivery of new content.

Preferably, the mobile portal is connected to the network via wireless communications.

Preferably, software resident at the ATM adjusts the content delivered from the mobile portal to suit the physical characteristics of the ATM.

According to a sixth aspect of the invention there is provided an ATM connected to a bank host via a switch for the delivery of traditional content; and connected to a mobile portal for the delivery of new content.

Preferably, the ATM prints content dynamically delivered from the mobile portal in conjunction with content that was resident at the ATM (such as advertising messages previously downloaded).

According to a seventh aspect of the invention there is provided a network, wherein the network identifies the user and presents new content associated with that user that reflects the user's preferences.

In one embodiment, the network may use a Bluetooth-enabled wireless device to identify the user.

In one embodiment the user preferences for content are similar to preferences the user has previously expressed for content to be delivered to a wireless device owned or operated by the user.

It will be appreciated that in such a network the ATM communicates with the mobile portal such that the content delivered from the mobile portal to the ATM is identical to the content the mobile portal would deliver to a wireless device owned or controlled by the user.

According to an eighth aspect of the invention there is provided a network comprising a plurality of ATMs connected to a bank host via a mobile portal for the delivery of both traditional and new content.

According to a ninth aspect of the invention there is provided a method of reducing the cost of operation of an ATM network, comprising the steps of: making traditional functions available through a mobile portal connected to the ATM network; and connecting the ATM network to a means for device management that has a lower cost of operation than the legacy switch; and disconnecting the legacy switch.

According to a tenth aspect of the invention there is provided a self-service terminal having a printer, the terminal including means for accessing a mobile portal, whereby the terminal is operable to retrieve information adapted for viewing on a portable device, and to print at least some of the retrieved information and to present the printed information to a user.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
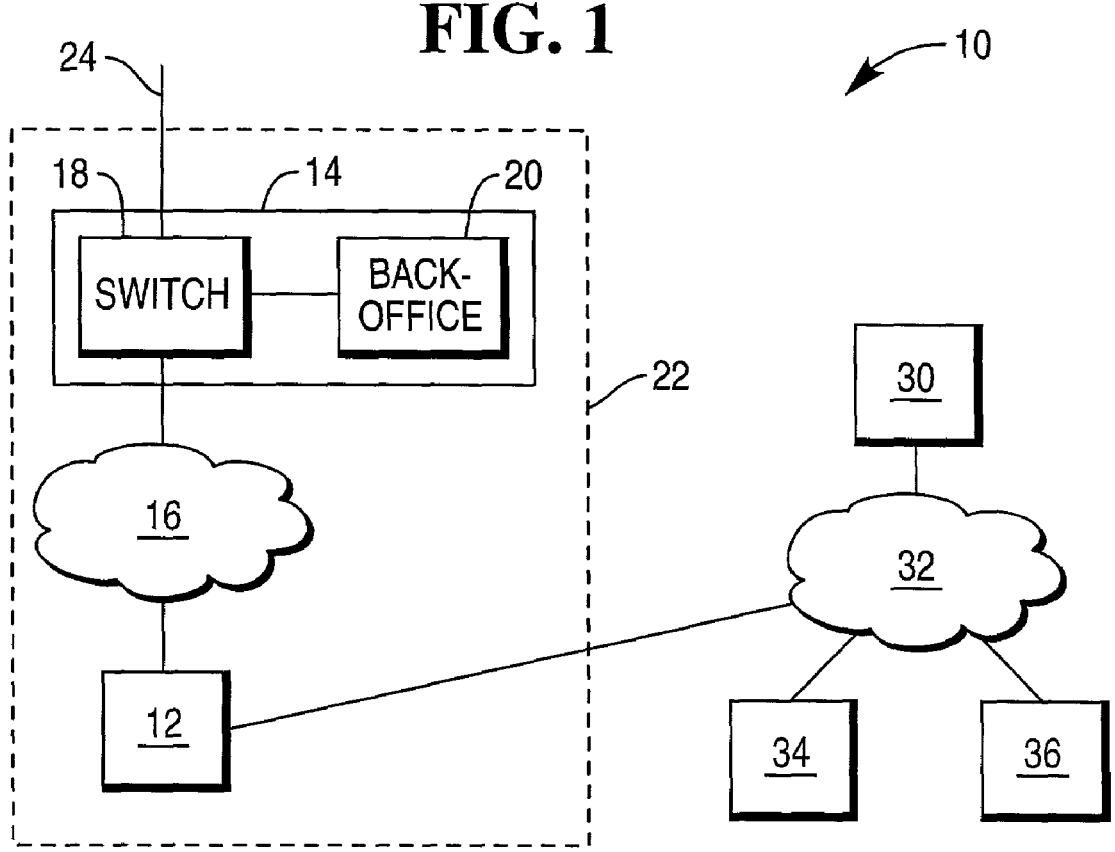
FIG. 1 is a block diagram of a self-service terminal network including an SST according to one embodiment of the present invention.

Reference is now made to FIG. 1, which shows an SST system 10 in the form of an ATM system. ATM system 10 comprises a plurality of ATMs 12 (only one of which is shown in FIG. 1) each connected to a financial institution's authorization center 14 via a secure private network 16. The center 14 comprises a switching device 18 and a back-office 20, where the back-office 20 includes an authorization facility.

The ATMs 12, private network 16, and authorization center 14 form an ATM network 22.

In a similar way as for conventional ATM networks, the switching device 18 is used for routing financial transaction authorization requests from the ATMs 12 to the authorization facility in the back-office 20. Switching device 18 is also able to route authorization requests to authorization centers (not shown) operated by other financial institutions and financial services companies via switch output 24.

Each ATM 12 is also connected to a conventional mobile portal 30 via a wireless network 32, in this embodiment using WAP. As is well known, a large number of content providers are accessible via the conventional mobile portal 30. As is also well known, portable wireless devices, such as cellular telephones and PDAs (for clarity, only one cellphone 34 and one PDA 36 are shown in FIG. 1), can also access the mobile portal 30. In FIG. 1, the ATM 12, cellphone 34, and PDA 36 are connected to the network 32 by a broken line to illustrate that these connections are wireless.

Figure 2:
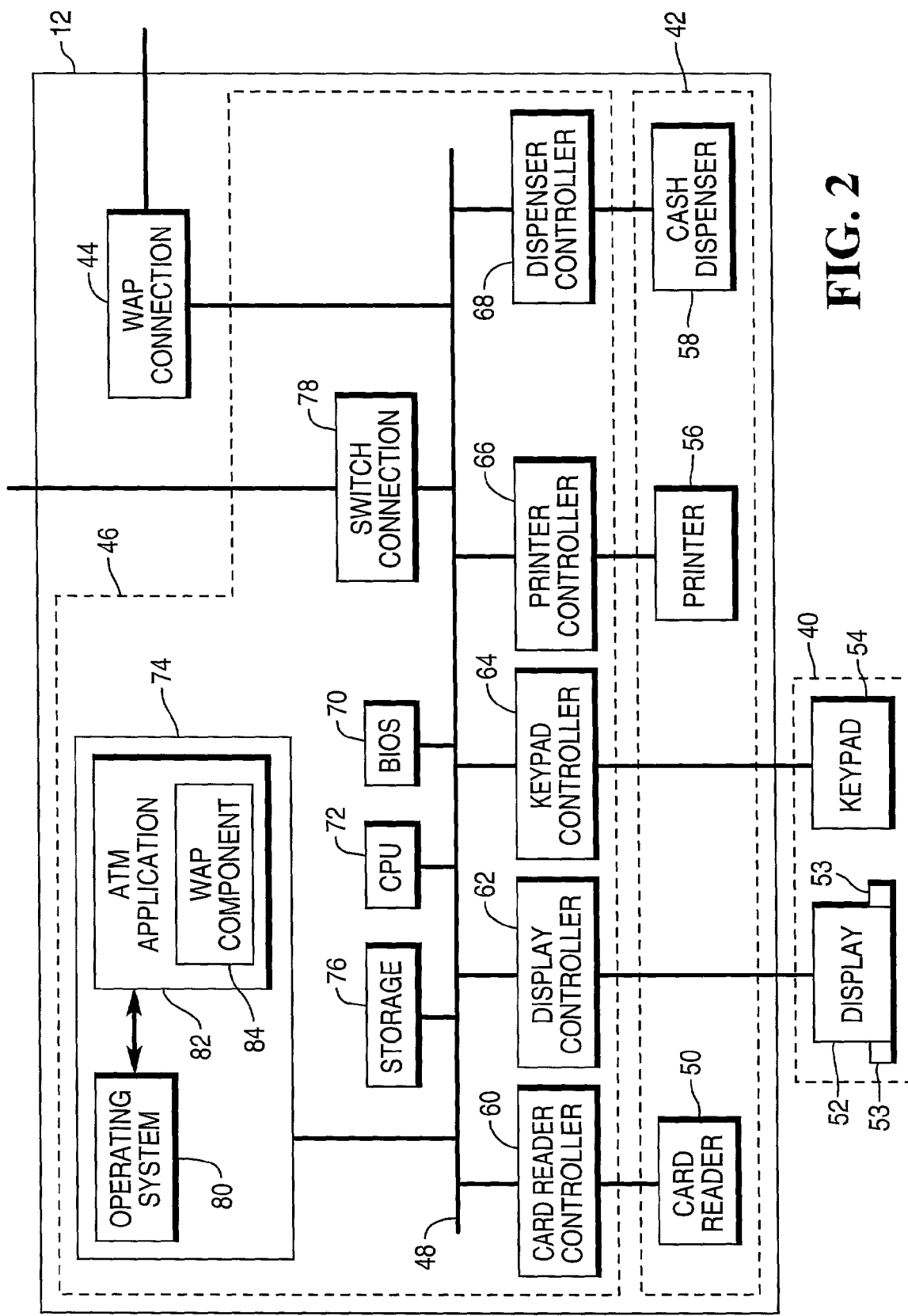
FIG. 2 is a block diagram of the SST of FIG. 1 in more detail.

Reference is now made to FIG. 2, which is a block diagram of the ATM 12 of FIG. 1. The ATM 12 comprises a user interface 40 and associated modules 42, a wireless network connection 44 (in the form of a wireless modem) for accessing the mobile portal 30, and an ATM controller 46.

The controller 46 includes a system bus (or a plurality of system buses) 48 that interconnects the wireless network connection 44 and the controller 46 to allow mutual intercommunication, and also connects various modules within the controller 46, as described below.

The user interface 40 comprises the following user interface elements: a card reader slot (not shown); a display 52; eight FDKs 53 associated with the display 52 and arranged as two columns, one on either side of the display 52; an encrypting keypad 54; a printer slot (not shown); and a cash dispenser slot (not shown). The associated modules 42 (that is, modules associated with the user interface elements) comprise a card reader 50, a printer 56, and a cash dispenser 58.

Controller 46 comprises modules for driving the user interface elements and associated modules 50 to 58, namely: card reader controller 60, display controller 62, keypad controller 64, printer controller 66, and dispenser controller 68. These user interface elements and associated modules (50 to 58) and associated controllers (60 to 68) are standard modules that are used on conventional ATMs and will not be described in detail herein.

The controller 46 also comprises a BIOS 70 stored in non-volatile memory, a microprocessor 72, associated main memory 74, storage space 76 in the form of a magnetic disk drive, and a dedicated switch connection 78 for connecting the ATM 12a to the authorization center 14 (FIG. 1).

In use, the ATM 12 loads an operating system kernel 80, and an ATM application program 82 into the main memory 74. The ATM application program 82 includes a mobile portal software component 84 in the form of a WAP emulation component which is embedded within the ATM application 82. For simplicity, hereinafter the WAP emulation component will be referred to as a WAP component. The WAP emulation component is similar to both a WAP browser and a WAP emulation program that is used to present wireless mark-up language (WML) files on PC displays.

The WAP component 84 differs from a conventional WAP browser in a number of ways. The WAP component is hard-coded to point at the mobile portal's WAP site. Thus, the WAP component only links to the mobile portal 30, and to content provided thereon. In addition, the WAP component 84 interfaces with the ATM application 82 so that functions that are conventionally selected using keys on a phone may be selected using keys on the ATM keypad 54, or FDKs 53, or an ATM touchscreen.

The ATM application program 82 is used to control the operation of the ATM 12. In particular, the ATM application program provides the sequence of screens used in each transaction (referred to as the application flow); and monitors the condition of each module within the ATM (state of health monitoring).

The term "screen" is used herein to denote the graphics, text, controls (such as menu options), and such like, that are displayed on a display; the term "screen" as used herein does not refer to the hardware (for example, the LCD, CRT, or touchscreen) that displays the graphics, text, controls, and such like. Typically, when a transaction is being entered at an SST, a series of screens are presented in succession on the SST display. For example, a first screen may request a user to insert a card, a second screen may invite the user to enter his/her PIN, a third screen may invite the user to select a transaction, and so on.

Figure 3:
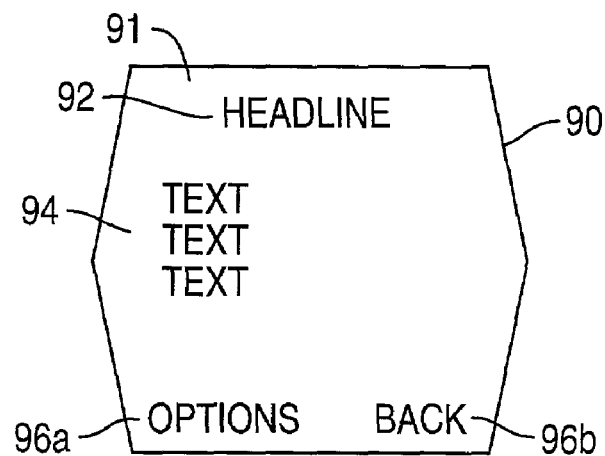
FIG. 3 is a pictorial view of a display of a portable wireless device.

A WML file contains information that is typically in the form of a headline, content text, and softkeys; this will now be described with reference to FIG. 3, which is a pictorial representation of a display 90 on a portable device (in this embodiment a cellular telephone).

A headline field 92 is typically rendered as the top line on a screen 91. A content text field 94 contains the main content of a WAP page and may include an image, a field for entering information, navigation links, and such like. Typically, a WAP browser can only present three to five lines of the content text field on a display. To view the remaining portion of the content text field a user must scroll down until the end of the field 94 is reached. A softkeys field 96 typically comprises keys that perform certain functions, such as navigation, selection, activation, and such like. In FIG. 3, one softkey 96a provides a list of options; and the other softkey 96b provides a 'back' function for returning to the previous screen.

A typical transaction will now be described from a user's perspective with reference to the drawings.

To initiate a transaction a user inserts his/her bank card (not shown) through the card reader slot (not shown) into card reader 50. The card reader 50 reads data from the card, where the data includes details of the authorized cardholder's identity and account details.

Figure 4:
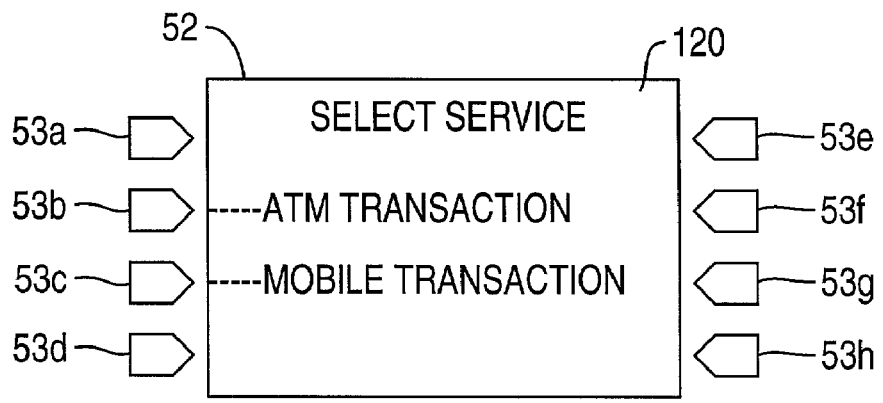
FIG. 4 illustrates a screen displayed at the start of a transaction at the terminal of FIG. 1.

As shown in FIG. 4, the ATM 12 then presents on display 52 a screen 120 inviting the user to select either a traditional ATM transaction or a mobile portal transaction. Each of these transactions may be selected by depressing an FDK 53 aligned with the transaction name. To select the traditional ATM transaction FDK 53b is depressed; whereas, to select the mobile portal transaction FDK 53c is depressed.

If a user selects the traditional ATM transaction then the transaction proceeds as for a conventional ATM transaction. As conventional ATM transactions are well known in the art, they will not be described in detail herein.

Figure 5:
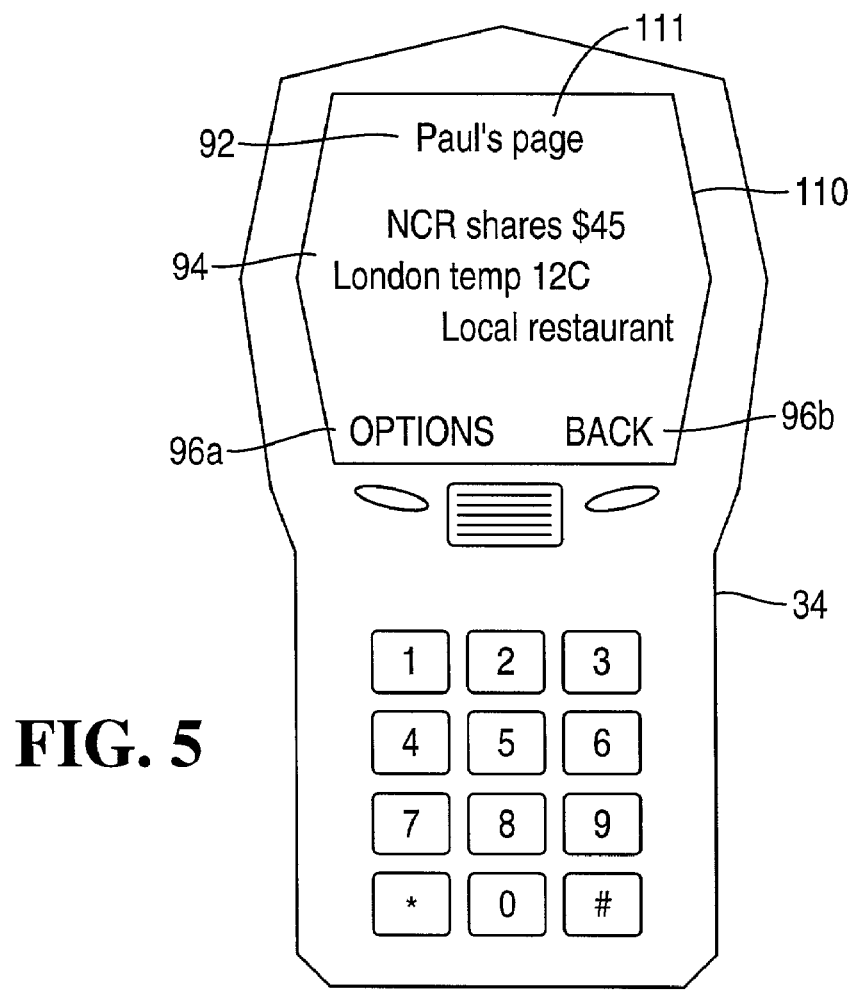
FIG. 5 is a pictorial view of a portable wireless device.

In this example, the user is called Paul, and he has used his cellphone 34 to personalize his browsing of the mobile portal 30 (the name of the mobile portal in this example is "Page"). In particular, as shown in FIG. 5, when Paul accesses the mobile portal 30, the cellphone's display 110 presents an initial screen 111 having the headline field 92 containing the text "Paul's Page"; a content text field 94 including the current share price of NCR Corporation (trade mark), the temperature in London, and the option to view a list of restaurants in the vicinity of his current location; and a softkeys field 96 containing the keys "OPTIONS" and "BACK". If Paul selects the option to view a map of his current location, then a second screen (FIG. 6B) is presented providing more details of a map.

This personalization information associated with Paul is stored at the mobile portal 30.

When Paul wishes to execute a transaction that requires some physical deliverable provided via the mobile portal 30, he selects the mobile portal transaction option on screen 120 (FIG. 5) by pressing FDK 53c.

The ATM application 82 then transmits the user's identity (in an encrypted or otherwise secure form) to the mobile portal 30.

The mobile portal 30 compares this received identity with a stored database of identities and associated personalization information, and if the mobile portal 30 stores personalization information associated with that user then the mobile portal transmits a WML file to the ATM 12, where the WML file includes information personalized for that user. In this example, the user's name is Paul and he has personalized his cellular telephone's access to the mobile portal 30 as described with reference to FIG. 5, so the mobile portal 30 transmits a WML file containing Paul's personalization information to the ATM 12.

Figure 6A:
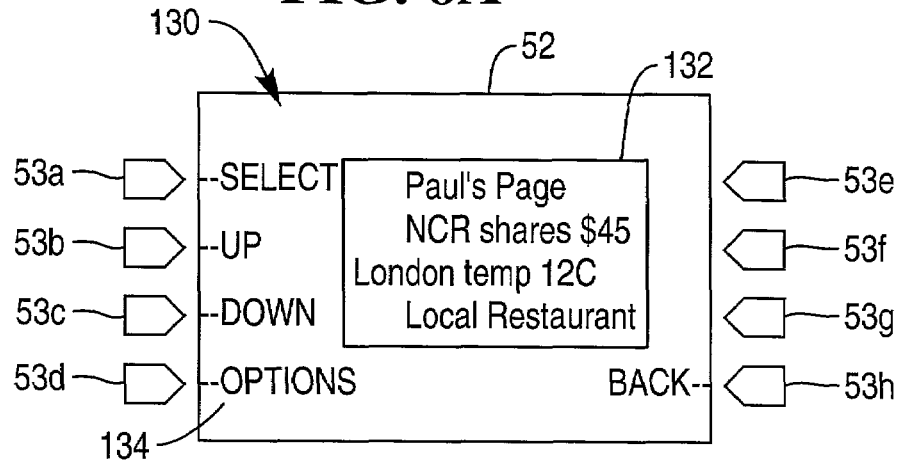
FIGS. 6A and 6B illustrate personalized screens displayed during a transaction at the terminal of FIG. 1.
Figure 6B:
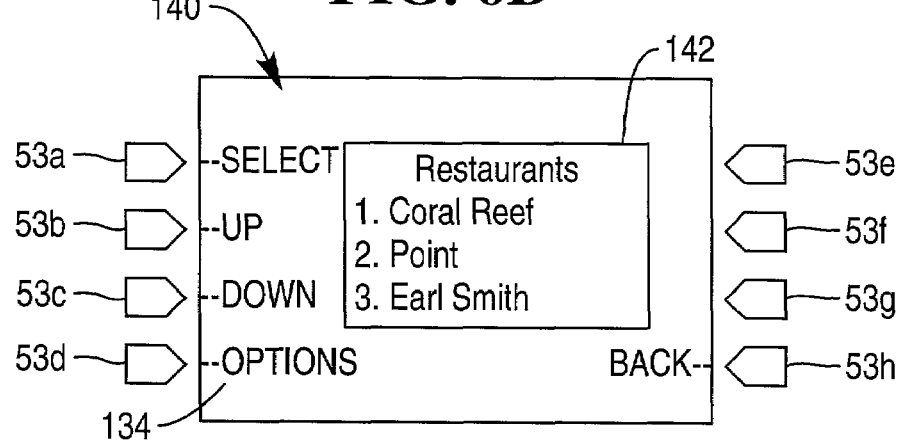

The ATM application 82 uses this WML file to create a screen 130 including a window 132 containing Paul's personalized information, and a frame 134 containing navigation options. The ATM application 82 then presents this personalized screen 130 (FIG. 6A) to Paul, as illustrated in FIG. 6A.

In the frame 134, the Web component maps the navigation options to the FDKs 53 so that a select option can be activated by pressing FDK 53a, scrolling options can be activated by pressing FDK 53b for scrolling up and FDK 53c for scrolling down, and Options softkey can be activated by pressing FDK 53d and Back softkey can be activated by pressing FDK 53h.

The Web component 84 of the ATM application 82 associates the functions selected using the FDKs 53 with the information presented on the window 132. Thus, a user is enabled to browse using the FDKs 53.

Part of the screen 130 (the frame 134) remains unchanged as Paul browses using the FDKs 53, so only the window 132 is updated while Paul is browsing.

From Paul's perspective, screen 130 is very similar to screen 111 (FIG. 5), so that Paul experiences the same personalized look from the mobile portal when using the ATM 12 as when using his cellphone 34. The main difference between screens 130 and 111 is that on screen 130, the FDKs 53 may be used to navigate.

If Paul selects the list of local restaurants function then the ATM application 82 displays another screen 140 having frame 134 and a new window 142. Window 142 names the three closest restaurants to the ATM 12 that meet Paul's predefined criteria, and includes text (not shown on FIG. 6B as user has to scroll down to view this text) indicating directions from the ATM 12 to each restaurant, together with an indication of what charge is levied for printing out a map to one of the restaurants as a hard copy.

If Paul instructs printing of a map to the first restaurant then the ATM application 82 presents a screen on the ATM 12 requesting Paul to enter his PIN and then authorizes the transaction using ATM network 22 (FIG. 1). If the transaction is authorized, then the ATM application 82 instructs the printer 56 to print a hard copy of the map and deliver the printed map to Paul via the printer slot (not shown). The map may be stored locally at the ATM, or it may be downloaded from the mobile portal 30.

If the transaction is not validated, then a screen is presented (not shown) indicating that the transaction was not authorized.

If another user (who has not personalized his browsing of the mobile portal 30) approaches the ATM 12, inserts his card, and selects the mobile transaction option, then, as in the previous example, the ATM application 82 transmits the user's identity (in an encrypted or otherwise secure form) to the mobile portal 30. However, the mobile portal 30 does not store any information relating to that user because the user has not personalized his browsing of the mobile portal 30, thus the mobile portal 30 transmits a generic WML file to the ATM 12.

Figure 7:
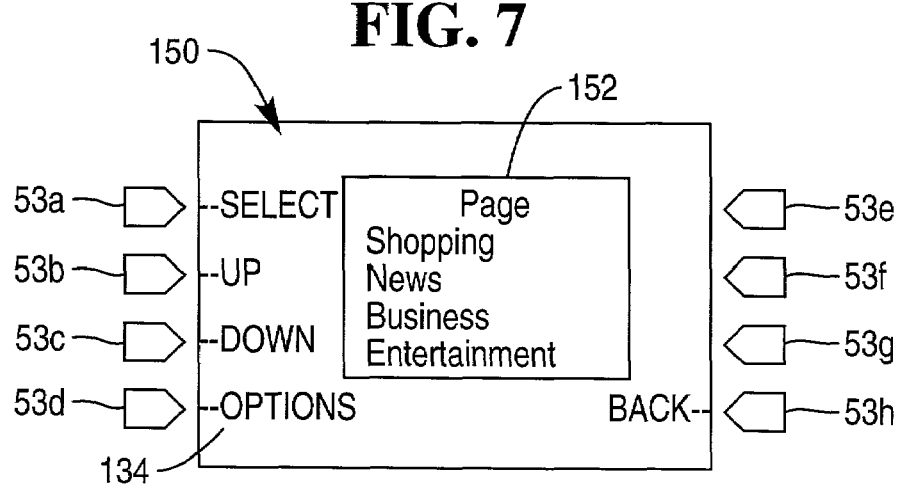
FIG. 7 illustrates a generic screen displayed during a transaction at the terminal of FIG. 1.

The ATM application 82 uses this WML file to create a generic screen 150 (as illustrated in FIG. 7) including a window 152 containing non-personalized information, and a frame 134 containing navigation options. The ATM application 82 then presents this generic screen 150 to the user, where the window 152 offers four types of services: shopping, news, business, and entertainment.

The ATM application 82 includes a timer object that measures how long a user has spent browsing through a mobile transaction. If the timer object reaches a predetermined count (for example thirty seconds) then the ATM application 82 automatically presents a screen informing the user that browsing time has elapsed and advising the user to remove his/her card. Once the card has been removed, the ATM application returns to an initial screen inviting a user to enter a card.

Thus, it will be appreciated that this embodiment of the present invention allows an is ATM to emulate a portable wireless device such as a cellphone, so that the ATM can access a mobile portal and provide a user with personalized WAP content on the ATM in a style and format similar to that provided on a cellphone but with an improved user interface. This allows a user to access many services that are available via mobile portals. By having a timer function, the ATM is able to ensure that "the sixty second experience" is not lengthened, thereby reducing potential frustration of users who have to wait in a long queue at the ATM.

Various modifications may be made to the above described embodiment within the scope of the invention, for example, in other embodiments, the mobile portal may use a different protocol to WAP, such as i-Mode, or such like.

In other embodiments, the SST may be an information kiosk.

In other embodiments, the ATM determines whether the mobile portal 30 has any personalization information relating to that user, and only sends the user's details to the mobile portal if the user has personalization information. The ATM application 82 may do this by storing either locally or remotely a table having an entry for each user and indicating whether that user has any associated personalization information. The ATM may require that a user inputs his/her PIN prior to determining whether the user has any personalization information. The personalization information may have been provided by a third party, and may relate to information that the third party believes may be relevant to an individual.

In other embodiments a portable device may be used instead of, or in addition to, a card. The portable device may include a local wireless communication mechanism (such as Bluetooth) to transmit data to and to receive data from the ATM.

In other embodiments, an ATM may not have FDKs, so that the WAP component may associate selectable options with keys on an encrypting keypad on the ATM, or with selectable buttons on a touchscreen if the ATM includes a touchscreen.

In other embodiments the timer function may be implemented differently, for example, a screen may inform a user that he/she may browse for a preset time. This time may be dependent on the time of day, the typical usage of the ATM, or such like. In other embodiments, a user may be charged for browsing, so that a user must pay for a predetermined amount of browsing time or a predetermined amount of data received.

In other embodiments the WAP component may be implemented by converting the received WML file into an HTML file and using a Web browser component to present the converted file on a screen.

In other embodiments the WAP component may configure the retrieved WML file into a format suitable for use by the ATM application. This may be accomplished by the WAP component parsing the received WML file to identify and extract the headline field, content text field, and softkeys field, and then passing the data extracted from these fields to the ATM application. The ATM application may use this data to populate fields within an ATM screen.

What is claimed is:

1. A terminal comprising an Automated Teller Machine, ATM, comprising:
   a) a display;
   b) a connection which connects the ATM to an authorization center which authorizes ATM transactions;
   c) means for retrieving, over a wireless channel, information from a mobile portal, which portal is different from the authorization center,
      i) which portal transmits information in a format compatible with screen size of a cellular telephone, and
      ii) which information is retrieved from a WAP site, which site
         A) conforms to a Wireless Internet Protocol, WAP, and
         B) acts as a web site which is accessible to cell phones; and d) means for presenting at least some of the retrieved information to a user on a window within the display of the ATM, such that contents of the window sometimes change while contents outside the window remain unchanged.

2. A terminal according to claim 1, wherein the means for retrieving includes a wireless transceiver and a software component which interfaces with the wireless transceiver and a terminal application to retrieve information from a mobile portal and configure the information to a format suitable for presentation on the display by the terminal application.

3. A terminal according to claim 1, further comprising a printer for providing a user with a hard copy of information retrieved from the mobile portal.

4. A terminal according to claim 1, further comprising (i) means for identifying the user to determine whether that user has provided said mobile portal with personalized information, and (ii) means for retrieving any such personalized information from the mobile portal.

5. A terminal according to claim 4, further comprising means for accessing a transaction authorization system, which means is separate from the means for accessing a mobile portal.

6. Terminal according to claim 1, wherein the information of paragraph 1(c), as received,
   i) is formatted for viewing on a portable device, but
   ii) is not displayed on any portable device, but displayed on the display of the ATM.

7. Terminal according to claim 1, wherein the information is compatible with (A) Wireless Application Protocol, WAP, or (B) i-Mode.

8. Terminal according to claim 1, wherein the means for accessing a mobile portal is restricted to accessing a single mobile portal, and no others.

9. Terminal according to claim 1, and further comprising:
   e) means for limiting the presentation on the display of paragraph (d) to a predetermined time, after which the information is removed.

10. Terminal according to claim 9, wherein the predetermined time is less than one minute.

11. Terminal according to claim 1, wherein the information is compatible with a Wireless Markup Language, WML, protocol.

12. Terminal according to claim 1, wherein the information displayed occupies between three and five lines on the display of the ATM.

13. Terminal according to claim 12, wherein the information displayed occupies part of the display of the ATM, and the remainder of the display remains unchanged.

14. An Automated Teller Machine, ATM, comprising:
   a) a display which presents information relating to ATM functions;
   b) means for retrieving information, over a wireless channel, from a mobile portal which transmits information which is
      i) in a format compatible with screen size of a cellular telephone,
      ii) transmitted according to WAP, Wireless Application Protocol, or i-Mode protocol, and
      iii) consistent with WML, Wireless Markup Language, standards;
   c) means for displaying at least some of the retrieved information in a window overlying the display, while leaving regions not covered by the window unchanged;
   d) means for limiting the display to a predetermined time; and
   e) means for limiting the ATM to retrieving information from a single mobile portal, and no others.

15. ATM according to claim 14, wherein the predetermined time is less than one minute.

16. ATM according to claim 14, wherein the information displayed occupies between three and five lines on the display of the ATM.

17. ATM according to claim 14, in which the information is retrieved from a WAP site, which
   i) conforms to a Wireless Internet Protocol, WAP, and
   ii) acts as a web site which is accessible to cell phones.

18. An Automated Teller Machine, ATM, comprising:
   a) a display;
   b) means for retrieving, over a wireless channel, information from a single predetermined mobile portal, and no others, which portal transmits information in a format compatible with screen size of a cellular telephone; and
   c) means for presenting at least some of the retrieved information to a user on the display of the ATM.

19. ATM according to claim 18, wherein the information is presented for a predetermined time, and then removed.

20. ATM according to claim 18, wherein the information displayed occupies between three and five lines on the display of the ATM.

21. ATM according to claim 18, wherein the information is
   i) in a format compatible with screen size of a cellular telephone,
   ii) transmitted according to WAP, Wireless Application Protocol, or i-Mode protocol, and
   iii) consistent with WML, Wireless Markup Language, standards.

22. ATM according to claim 18, in which the information is retrieved from a WAP site, which
   i) conforms to a Wireless Internet Protocol, WAP, and
   ii) acts as a web site which is accessible to cell phones.

* * * * *